(12) United States Patent
Lessard et al.

(10) Patent No.: US 9,388,959 B2
(45) Date of Patent: Jul. 12, 2016

(54) WHITE-LIGHT EMITTER HAVING A MOLDED PHOSPHOR SHEET AND METHOD OF MAKING SAME

(75) Inventors: Jason Lessard, Bow, NH (US); Edward Otto, Henniker, NH (US)

(73) Assignee: OSRAM SYLVANIA Inc., Wilmington, MA (US)

( * ) Notice: Subject to any disclaimer, the term of this patent is extended or adjusted under 35 U.S.C. 154(b) by 74 days.

(21) Appl. No.: 13/410,669

(22) Filed: Mar. 2, 2012

(65) Prior Publication Data

US 2013/0228800 A1    Sep. 5, 2013

(51) Int. Cl.
| | |
|---|---|
| *H01L 33/50* | (2010.01) |
| *F21V 9/10* | (2006.01) |
| *B32B 27/28* | (2006.01) |
| *C09K 11/00* | (2006.01) |
| *F21V 3/04* | (2006.01) |
| *F21V 9/16* | (2006.01) |
| *F21Y 101/02* | (2006.01) |

(52) U.S. Cl.
CPC . *F21V 9/10* (2013.01); *B32B 27/28* (2013.01); *C09K 11/00* (2013.01); *F21V 3/0463* (2013.01); *F21V 9/16* (2013.01); *F21Y 2101/02* (2013.01)

(58) Field of Classification Search
CPC ........ H01L 33/08; H01L 33/50; H01L 33/505
USPC ...................................... 257/79, 88
See application file for complete search history.

(56) References Cited

U.S. PATENT DOCUMENTS

| | | | |
|---|---|---|---|
| 7,319,246 B2 | 1/2008 | Soules et al. | |
| 7,858,998 B2 | 12/2010 | Negley | |
| 8,022,626 B2 | 9/2011 | Hamby et al. | |
| 2007/0007892 A1 | 1/2007 | Shapiro et al. | |
| 2007/0031685 A1* | 2/2007 | Ko et al. | 428/447 |
| 2010/0067229 A1 | 3/2010 | Scotch et al. | |
| 2010/0067240 A1 | 3/2010 | Selverian et al. | |
| 2010/0067241 A1 | 3/2010 | Lapatovich et al. | |
| 2010/0237375 A1 | 9/2010 | Yamazaki et al. | |
| 2010/0291313 A1* | 11/2010 | Ling | C09K 11/02 427/475 |
| 2011/0002140 A1* | 1/2011 | Tsukahara et al. | 362/602 |
| 2011/0031516 A1 | 2/2011 | Basin et al. | |

FOREIGN PATENT DOCUMENTS

CN          101889356 A      11/2010

* cited by examiner

*Primary Examiner* — Asok K Sarkar
*Assistant Examiner* — Dmitriy Yemelyanov
(74) *Attorney, Agent, or Firm* — Edward S. Podszus

(57) ABSTRACT

A white-light emitter is disclosed, in which a silicone sheet is laminated between a pair of optically clear plastic sheets. The silicone sheet lacks the ability to retain its shape, while the three sheets, when sealed together, can retain a shape. The silicone sheet includes at least one phosphor, with a phosphor concentration between two percent and ten percent. The silicone sheet may be produced by molding. Compared to comparable silicone parts made by extrusion, the molded parts may show less part-to-part variation in color temperature, may be run in significantly smaller batches or as one-offs, and may allow the silicone and phosphor material to be mixed by hand or with a relatively simple mixing machine. In some cases, the sheets are sealed together at their perimeters and include a margin around the phosphor sheet. In some cases, the phosphor sheet includes a mixture of different phosphors.

14 Claims, 4 Drawing Sheets

WHITE-LIGHT EMITTER HAVING A MOLDED PHOSPHOR SHEET AND METHOD OF MAKING SAME

TECHNICAL FIELD

The present invention relates to a white-light emitter for use with at least one blue light emitting diode (LED).

BACKGROUND OF THE INVENTION

Recent years have seen significant progress in the field of white-light emitters, which include a phosphor illuminated by at least one blue light emitting diode.

Some white-light emitters are configured so that the phosphor or a phosphor layer directly contacts the LED die. There are potential drawbacks to such a configuration. For instance, the photon density may be relatively high and may saturate the phosphor. In addition, the LED may be relatively hot, and the high heat may darken the phosphors over time and reduce the efficiency of the device.

For these and other reasons, a different configuration has become favored in particular applications, where the phosphor is physically separated from the LED die. This configuration is known as including a "remote" phosphor. The remote phosphor is physically spaced from the LED die, leading advantageously to a reduction in photon density and a reduction in heat exposure for the phosphor.

Some remote phosphor configurations use an extruded plastic pre-form, typically made from clear polypropylene or polyethylene that includes the phosphor. These extruded forms may be formed into generally convenient shapes, such as the exterior lens of a light fixture. However, there are several disadvantages to use of an extruded element.

For instance, the extrusion process gives a part-to-part variation in color temperature that may be unacceptably large. For instance, in some cases the variation in color temperature from part-to-part may be as large as +/−500K. Use of these extruded parts, with such a large part-to-part variation in color temperature, may require sorting and binning of the parts in order to meet an overall color temperature tolerance for a device, which is undesirable. Another potential disadvantage is that the extrusion process requires the running of relatively large amounts of material, even if only small amounts are needed. Still another potential disadvantage is that the extrusion process may require relatively complicated equipment for compounding, which blends the phosphor into a plastic base material.

For at least these reasons, it would be desirable to have a remote phosphor element formed from a process other than extrusion.

SUMMARY OF THE INVENTION

An embodiment is a white-light emitter. A silicone sheet lacking a self-shape-retaining ability has a phosphor concentration between two percent and ten percent. A pair of optically clear plastic sheets are laminated on opposite sides of the flexible silicone sheet and contact the flexible silicone sheet. The white-light emitter possesses a self-shape retaining ability.

Another embodiment is a method. At least one phosphor is mixed with an optical grade silicone material to form a phosphor silicone mix. The phosphor silicone mix is disposed in a vacuum chamber. The vacuum chamber is evacuated to form a degassed phosphor silicone mix. The degassed phosphor silicone mix is spread on a platen of a mold. The mold and the spread degassed phosphor silicone mix are disposed in a curing oven. The temperature of the mold and the spread degassed phosphor silicone mix is elevated in the curing oven. The spread degassed phosphor silicone mix forms a cured phosphor silicone sheet at the elevated temperature. The cured phosphor silicone sheet is removed from the mold. The cured phosphor silicone sheet is disposed between sheets of optically clear plastic. Air is removed from between the cured phosphor silicone sheet and the sheets of optically clear plastic. The cured phosphor silicone sheet is laminated to the sheets of optically clear plastic at the margins. The lateral edges of the cured phosphor silicone sheet and the sheets of optically clear plastic are sealed.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION OF THE INVENTION

A white-light emitter is disclosed, in which a silicone sheet is laminated between a pair of optically clear plastic sheets. The silicone sheet lacks the ability to retain its shape, while the three sheets, when sealed together, can retain a shape. The silicone sheet includes at least one phosphor, with a phosphor concentration between two percent and ten percent. The silicone sheet may be produced by molding. Compared to comparable silicone parts made by extrusion, the molded parts may show less part-to-part variation in color temperature, may be run in significantly smaller batches or as one-offs, and may allow the silicone and phosphor material to be mixed by hand or with a relatively simple mixing machine. In some cases, the sheets are sealed together at their perimeters and include a margin around the phosphor sheet. In some cases, the phosphor sheet includes a mixture of different phosphors.

The above paragraph is merely a generalization of several of the elements and features described in detail below, and should not be construed as limiting in any way.

Figure 1:
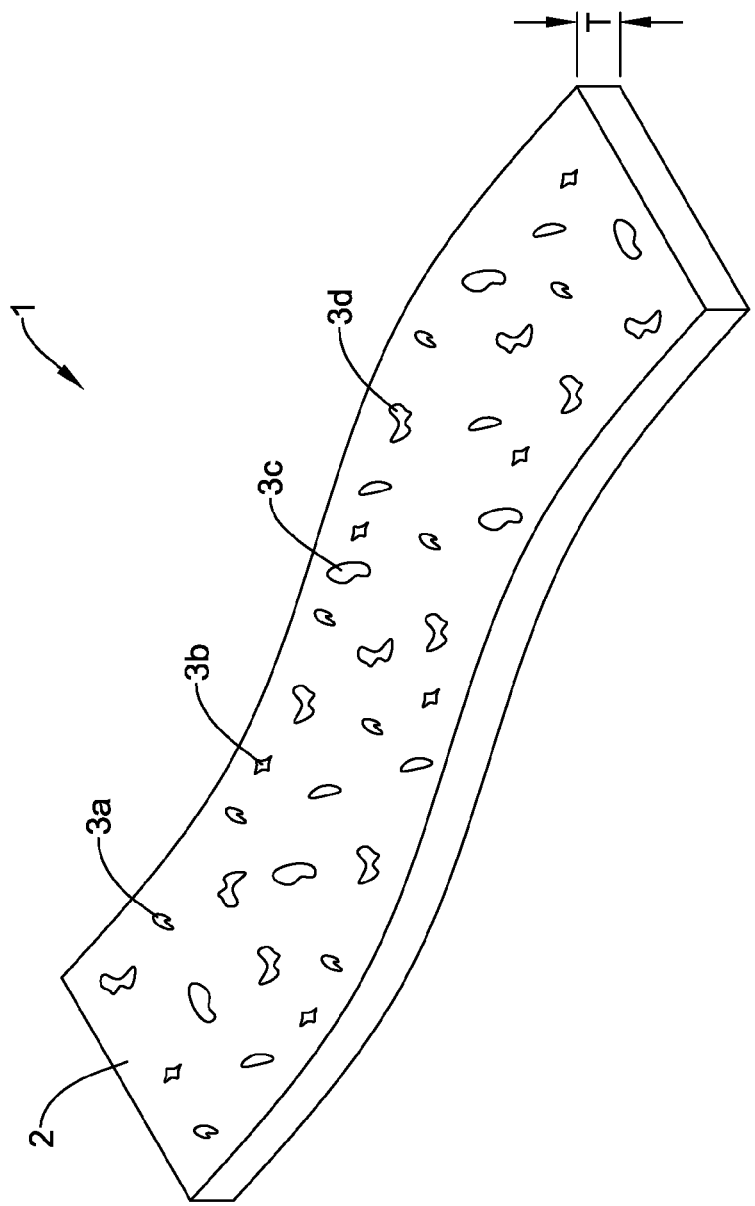
FIG. 1 is a schematic drawing of a flexible silicone sheet, having at least one phosphor embedded within a silicone base material.

FIG. 1 is a schematic drawing of a flexible silicone sheet 1, having at least one phosphor 3 embedded within a silicone base material 2. In an actual device, the flexible silicone sheet 1 would be sealed within a pair of plastic sheets that provide support, but the flexible silicone sheet 1 is shown by itself in FIG. 1 for clarity. The flexible silicone sheet 1 is shown in FIG. 1 as having a rectangular outer edge, although the sheet 1 may be molded into any suitable shape. In some cases, the flexible silicone sheet 1 has a thickness, T, between 0.1 mm and 0.5 mm.

In general, in order to achieve a particular appearance for a light fixture, one may use a combination of different phosphors in the silicone sheet 1. The phosphors have different emission spectra, so that combining them with the proper weight percentage can achieve a desired output spectrum. In general, the phosphor content within the silicone sheet 1 is between two percent and ten percent, where the phosphor content can include one phosphor or combinations of different phosphors. In other words, the total, combined weight percentage of all the different phosphors may be between two percent and ten percent of the flexible silicone sheet 1.

For example, three common phosphors emit light primarily in the red, yellow and green portions of the spectrum. One may combine the phosphors in a similar manner one would combine red, yellow and green light. A typical approximation of daylight may use a combination of these three different phosphors, with red, yellow and green outputs being combined with particular weight percentages. As another example, an indoor light, which may approximate that of a tungsten filament, may use four different phosphors. In addition to the red, yellow and green phosphors described above, one may also add in an orange phosphor to approximate indoor light.

Each of these desired outputs may be referred to as "white light". In this document, "white light" may include a range of different color temperatures, such as "cool white", "warm white", and so forth.

In general, these phosphors are commercially available, with known, published spectra. Selection of the specific phosphors and determination of the proper weight percentages to achieve a desired effect is typically found through routine experimentation.

In FIG. 1, the phosphors 3 are shown as particles fixedly immersed within the flexible silicone sheet 1. Four phosphor particles 3a, 3b, 3c and 3d, are labeled in FIG. 1. In some cases, the four particles 3a, 3b, 3c, 3d are a single phosphor. In other cases, each particle 3a, 3b, 3c, 3d is one of two, three or four different phosphors.

Many of these commercially available phosphors are designed to absorb blue light, usually with a wavelength range between 440 nm and 470 nm. In some cases, the "blue" portion of the spectrum is between 455 nm and 470 nm, while the "deep blue" portion of the spectrum is between 440 nm and 455 nm.

The blue light for these phosphors is generated by one or more blue light-emitting diodes (LEDs). As described below, the blue LEDs are included in an array, and are spaced apart from the flexible silicone sheet 1. Blue light emitted from the array is absorbed by the phosphor 3 in the flexible silicone sheet 1. White light is emitted by phosphor 3 in the flexible silicone sheet 1 in response to the absorbed blue light.

The flexible silicone sheet 1 is too thin, too flimsy or too soft to support itself. The sheet 1 lacks the ability to support its own shape, and sags under its own weight. In an actual device, the flexible silicone sheet 1 is mounted between two clear plastic sheets.

Figure 2:
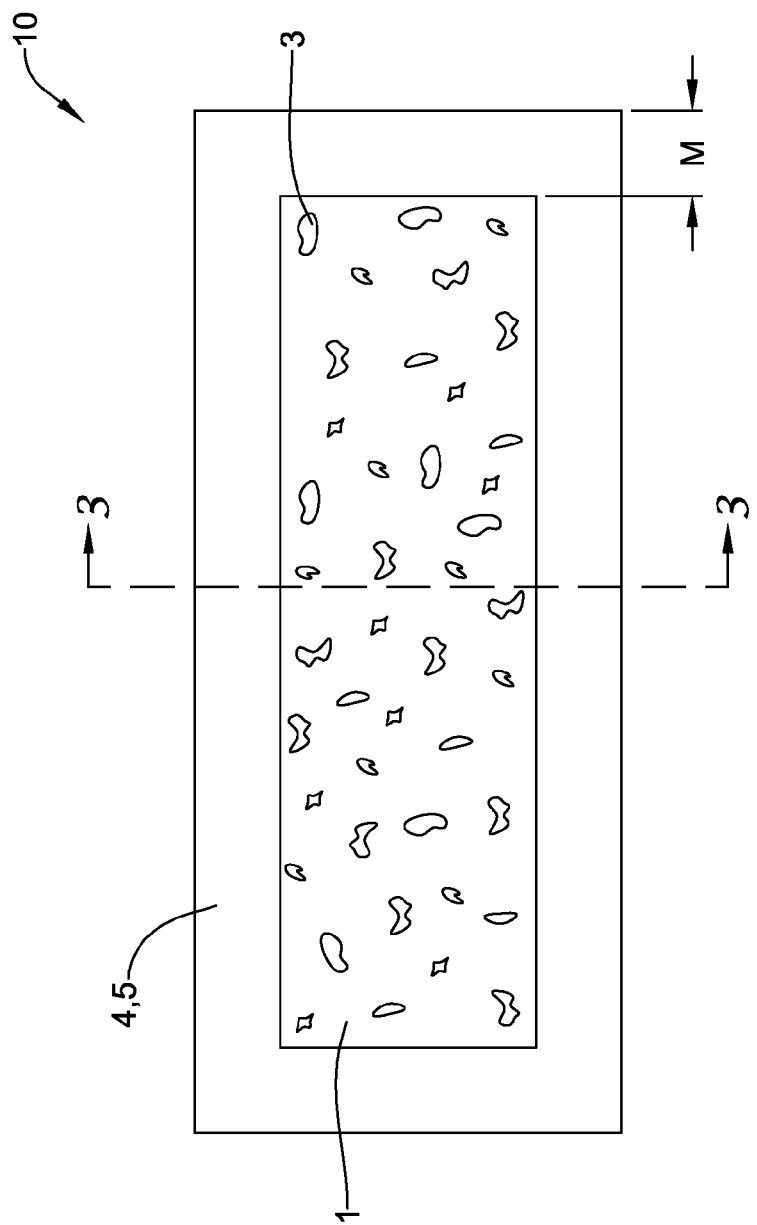
FIG. 2 is a side view drawing of a white light emitter.
Figure 3:
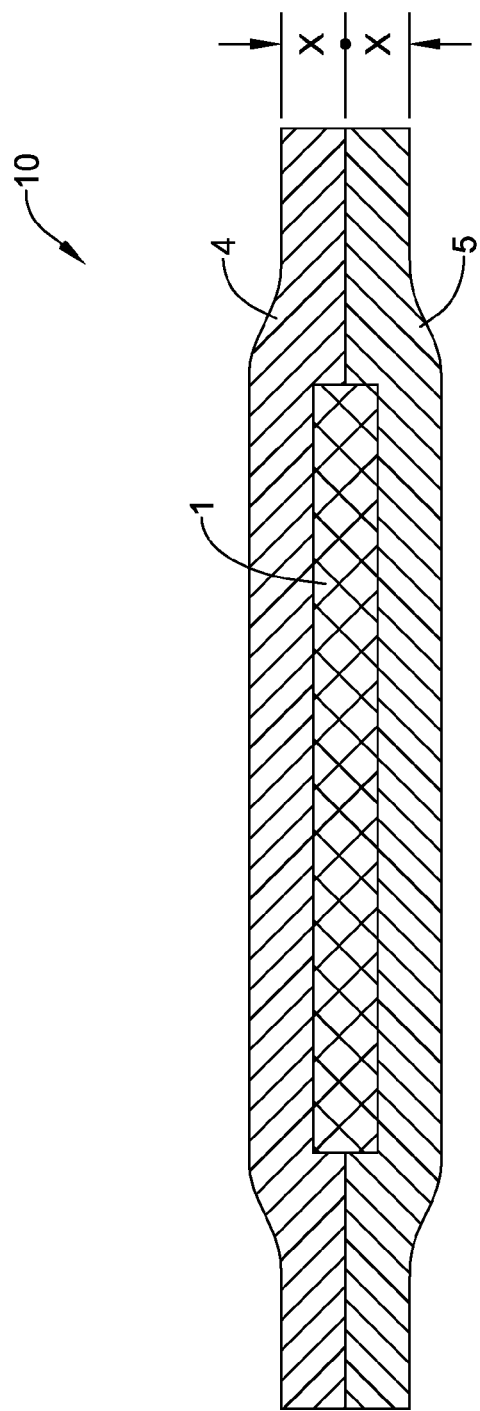
FIG. 3 is a cross-sectional drawing of the white light emitter of FIG. 2.

FIG. 2 is a side view drawing of a white light emitter 10 that includes a pair of optically clear plastic sheets 4 and 5, which are laminated on opposite sides of the flexible silicone sheet 1 and contact the flexible silicone sheet 1. FIG. 3 is a cross-sectional drawing of the white light emitter 10 of FIG. 2.

As an intact unit, the white light emitter 10 is more structurally sound than the bare silicone sheet 1, and does have the ability to retain its own shape. The skilled artisan can select the plastic sheets 4 and 5 to be each more rigid than the bare silicone sheet 1, assuming similar thickness and lateral dimensions. Combined with a 0.5 mm-thick silicone sheet 1, the resultant composite is relatively stiff. Increasing the thickness of the plastic sheets 4 and 5 will tend to increase self-shape retaining ability with minimal impact on optical performance. Once the light is traveling through the clear material there is minimal loss, assuming the material of sheets 4 and 5 is transparent. Most of the optical losses occur at reflection from the surfaces, which is independent of the thicknesses of silicone sheet 1 and plastic sheets 4 and 5. In some cases, the thickness of each plastic sheet, X, is between 0.1 mm and 0.5 mm. In some cases, the thicknesses of the plastic sheets 4, 5 are the same; in other cases, the thicknesses are different. In some cases, the pair of plastic sheets has evenly spaced margins, M, between 6 mm and 13 mm around the flexible silicone sheet 1. A typical lateral dimension may be about 75 mm, although lateral dimensions may be anywhere in the range from a few mm to about 1 m or greater. It is understood that other sizes and thicknesses may be used as well.

Figure 4:
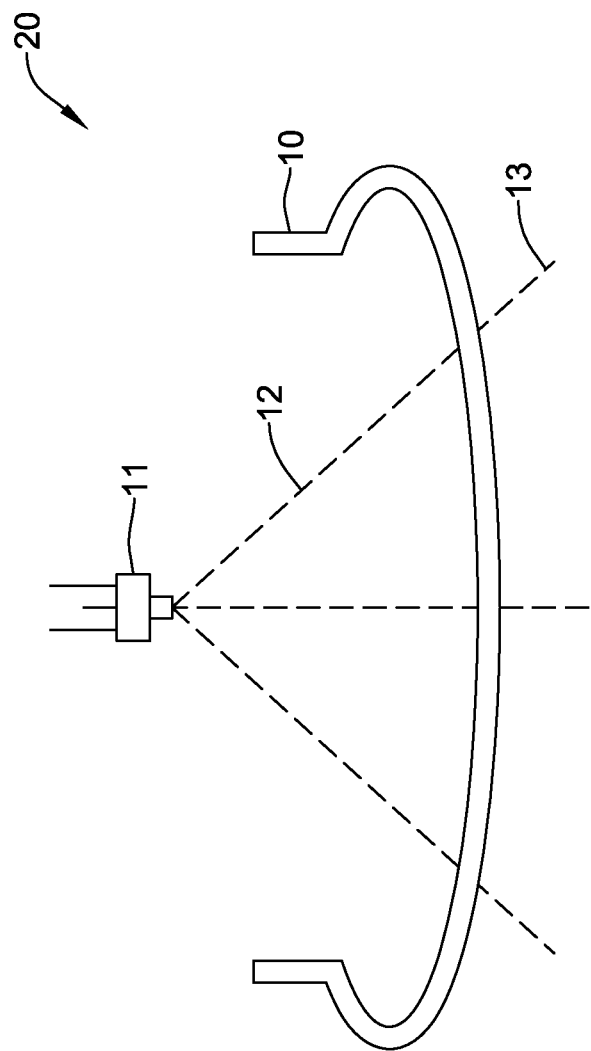
FIG. 4 is a side-view schematic drawing of an example light fixture that uses the white light emitter of FIGS. 2 and 3.

FIG. 4 is a side-view schematic drawing of an example light fixture 20 that uses the white light emitter 10 of FIGS. 2 and 3. The white light emitter 10 in this example is formed as a lens assembly to an enclosed lighting element. The surface of the emitter 10 emits a white light glow, producing a lighting effect much like older fluorescent light fixtures, in which translucent plastic covers enclose fluorescent tube lights. The translucent plastic cover from those older fixtures appears as a bright surface that emits outward in a reasonably wide angular range. Similarly, the surface of the emitter 10 also appears as a bright surface that emits into a reasonably wide angular range.

The light fixture 20 may be elongated in the direction out of the page, and may take on the size and shape of a common, older fluorescent work light, typically used above a work bench or a desk space. An array of blue LEDs, shown in FIG. 4 as a single blue LED 11, may lie at a back end of a cavity inside the light fixture 20. The array may be arranged as a 3-by-12 rectangle of LEDs inside the cavity of the light fixture 20, although any suitable configuration may be used. The circuitry for controlling the LEDs may be located along the same back end of the cavity inside the light fixture 20.

The blue LEDs 11 produce blue excitation light 12 directed toward the white light emitter 10. Phosphor particles in the white light emitter 10 absorb the blue excitation light 12 and emit phosphor light. The white light 13 produced by the light fixture 20 is a combination of the phosphor light and transmitted (non-absorbed) blue excitation light 12.

The following paragraphs describe an exemplary manufacturing process for the flexible silicone sheet and for the white light emitter 10. It will be understood that other suitable manufacturing processes may be used as well.

First, at least one phosphor is mixed with an optical grade silicone material to form a phosphor silicone mix. The mix of phosphors is chosen based on the desired spectrum of the phosphor light, and is typically chosen after simulation or through routine experimentation. The concentration level of the phosphor mix is typically between two percent and ten percent.

Next, the phosphor silicone mix is placed in a vacuum chamber and degassed. The vacuum level and time within the chamber are dependent on the volume of the phosphor silicone mix, and are typically found through routine experimentation.

Next, the degassed phosphor silicone mix is spread on a platen of a mold. In some cases, the mold platen is self-leveling. It is beneficial to avoid creating air bubbles when filling the mold platen. Any noted air bubbles should be dislodged before installing the top half of the mold.

Next, the spread, degassed phosphor silicone mix is cured in a curing oven at an elevated temperature. The cure temperature and cure time are typically prescribed by the silicone manufacturer, and may be altered as needed through routine experimentation.

After curing, the mold is removed from the oven and is left out to cool to room temperature. The mold halves are then disassembled, and the cured silicone phosphor sheet is removed from the mold.

The cured silicone phosphor sheet 1 is placed between two sheets 4, 5 of optically clear plastic. The plastic type and the thickness of the sheets 4, 5 depend on the particular application for which the device is used. In one particular application, the optically clear plastic sheets 4, 5 have a 6 mm to 13 mm evenly spaced margin around the silicone phosphor sheet 1. Some example materials that may be used for the clear plastic sheets 4, 5 include polycarbonate, PMMA (acrylic), polystyrene and COC (cyclic olefin copolymer). It is understood that different clear plastic materials may be used for plastic sheets 4 and 5.

The three-sheet assembly is then laminated together at the margins in a vacuum chamber to remove air between the sheets and seal the edges. The sealed three-sheet assembly may be formed as a flat, or planar, pre-form or may be formed as a shaped pre-form, such as the cover shown in side view in FIG. 4.

Unless otherwise stated, use of the words "substantial" and "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one, of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

PARTS LIST

1 light emitter
2 silicone base material
3 phosphor
3*a*, 3*b*, 3*c*, 3*d* phosphor particles
4 plastic sheet
10 white light emitter
11 blue LEDs
12 blue excitation light
13 white light

What is claimed is:

1. A white-light emitter, consisting of:
   a silicone sheet having a phosphor concentration between two percent and ten percent;
   a first optically clear plastic sheet (4) with a single material and having only a single layer;
   a second optically clear plastic sheet (5) with a single material and having only a single layer; and
   wherein the first and second optically clear plastic sheets are laminated on opposite sides of the silicone sheet and directly contacting the silicone sheet, wherein the plastic sheets are directly contactingly scaled together at lateral edges thereof surroundingly sealing the silicone sheet and devoid of an intermediary between sealed lateral edges thereof;
   whereby the white-light emitter possesses a self-shape retaining ability.

2. The white-light emitter of claim 1, wherein the silicone sheet has a thickness between 0.1 mm and 0.5 mm.

3. The white-light emitter of claim 1; wherein each sheet of optically clear plastic has a thickness between 0.1 mm and 0.5 mm.

4. The white-light emitter of claim 1, wherein the silicone sheet includes a single phosphor.

5. The white-light emitter of claim 1, wherein the silicone sheet includes two different phosphors.

6. The white-light emitter of claim 1, wherein the silicone sheet includes at least three different phosphors.

7. The white-light emitter of claim 1, wherein the first and second optically clear plastic sheets have evenly spaced margins between 6 mm and 13 mm around the silicone sheet.

8. The white-light emitter of claim 1, in combination with a light source,
   the light source further comprising an array of blue light-emitting diodes (11) spaced apart from the silicone sheet;
   wherein blue light twitted from the array is absorbed by the phosphor in the silicone sheet; and
   wherein white light is emitted by the phosphor in the silicone sheet in response to the absorbed blue light.

9. The white-light emitter of claim 1, wherein each of the first and second optically clear plastic sheets is brined of anon-silicone containing material.

10. The white-light emitter of claim 1, wherein each of the first and second optically clear plastic sheets consists essentially of a non-silicone containing material.

11. The white-light emitter of claim 1, wherein each of the first and second optically clear plastic sheets is substantially flat in a region overlying said silicone sheet.

12. The white-light emitter of claim 1, wherein each said optically clear plastic sheet and said silicone sheet has a thickness between 0.1 mm and 0.5 mm.

13. The white-light emitter of claim 1, wherein each of the first and second optically clear plastic sheets is formed of a non-silicone containing material and has a thickness between 0.1 mm and 0.5 mm.

14. The white-light emitter of claim 1, wherein said silicone sheet lacks a self-shape-retaining ability.

\* \* \* \* \*